(12) United States Patent
Bonnan

(10) Patent No.: US 8,903,221 B2
(45) Date of Patent: Dec. 2, 2014

(54) MEANS FOR PROTECTING AGAINST NON-AUTHORISED READINGS OF A RECORDING SUPPORT

(76) Inventor: Cyril Bonnan, Levallois-Perret (FR)

(*) Notice: Subject to any disclaimer, the term of this patent is extended or adjusted under 35 U.S.C. 154(b) by 1158 days.

(21) Appl. No.: 12/085,915

(22) PCT Filed: Nov. 30, 2006

(86) PCT No.: PCT/EP2006/069170
§ 371 (c)(1),
(2), (4) Date: Sep. 1, 2009

(87) PCT Pub. No.: WO2007/063117
PCT Pub. Date: Jun. 7, 2007

(65) Prior Publication Data
US 2010/0021131 A1    Jan. 28, 2010

(30) Foreign Application Priority Data
Dec. 1, 2005 (FR) .................................... 05 12191

(51) Int. Cl.
*H04N 5/92* (2006.01)
*G11B 20/00* (2006.01)

(52) U.S. Cl.
CPC .... *G11B 20/00152* (2013.01); *G11B 20/00086* (2013.01)
USPC ....................................................... 386/248

(58) Field of Classification Search
CPC .................. G11B 20/00152; G11B 20/00086; G11B 27/105; G11B 27/329; G11B 2220/2562; H04N 5/85; H04N 9/8042
USPC ....................................................... 386/248
See application file for complete search history.

(56) References Cited

U.S. PATENT DOCUMENTS

| 2003/0011640 A1* | 1/2003 | Green et al. ................... 345/810 |
| 2005/0163479 A1* | 7/2005 | Green ............................. 386/69 |
| 2008/0209571 A1* | 8/2008 | Bhaskar et al. ................. 726/28 |

FOREIGN PATENT DOCUMENTS

WO    WO 2004/109678 A1    12/2004

OTHER PUBLICATIONS

Kieskeurig, "Samsung HTP-1200 home cinema systeem—prijsvergelijk, producvergelijk en reviews," retrieved from the Internet: <http://www.kieskeurig.nl/product/36F90678316FB362C12570590038BDCD.htm> (Apr. 5, 2007), 1 page.

(Continued)

*Primary Examiner* — Thai Tran
*Assistant Examiner* — William Tran
(74) *Attorney, Agent, or Firm* — Blakely Sokoloff Taylor & Zafman

(57) ABSTRACT

An especially multimedia work is stored on an information support accessible by reading, said work to be read by an appliance comprising a control unit provided with navigation means associated with a representation, on a visualization screen, of the navigation actions carried out. The support stores a composition (authoring) comprising pages to be displayed on the screen and links between said pages according to navigation actions carried out therein. According to the invention, the composition contains a set of pages of choices, each enabling a user to carry out, by means of the navigation means, one of a plurality of choices for forming a combination of choices, the links between said pages being such that the work can only be read if the different choices carried out correspond to a pre-determined combination. In this way, the reading can only be carrier out, due to a simple authoring process, when a pre-determined code is introduced.

10 Claims, 1 Drawing Sheet

(56) References Cited

OTHER PUBLICATIONS

Pioneer, DVD Player DVD-V7200 Operating Instructions (Basic Operations), 1998, 54 pages.

Samsung, Slim Digital Home Cinema System: HT-P1200 Instruction Manual, retrieved from the Internet <http: product.samsung.com/micro_manuals/htp1200/um_ht_p1200_manual_eng_050719.pdf> (Apr. 5, 2007), 88 pages.

* cited by examiner

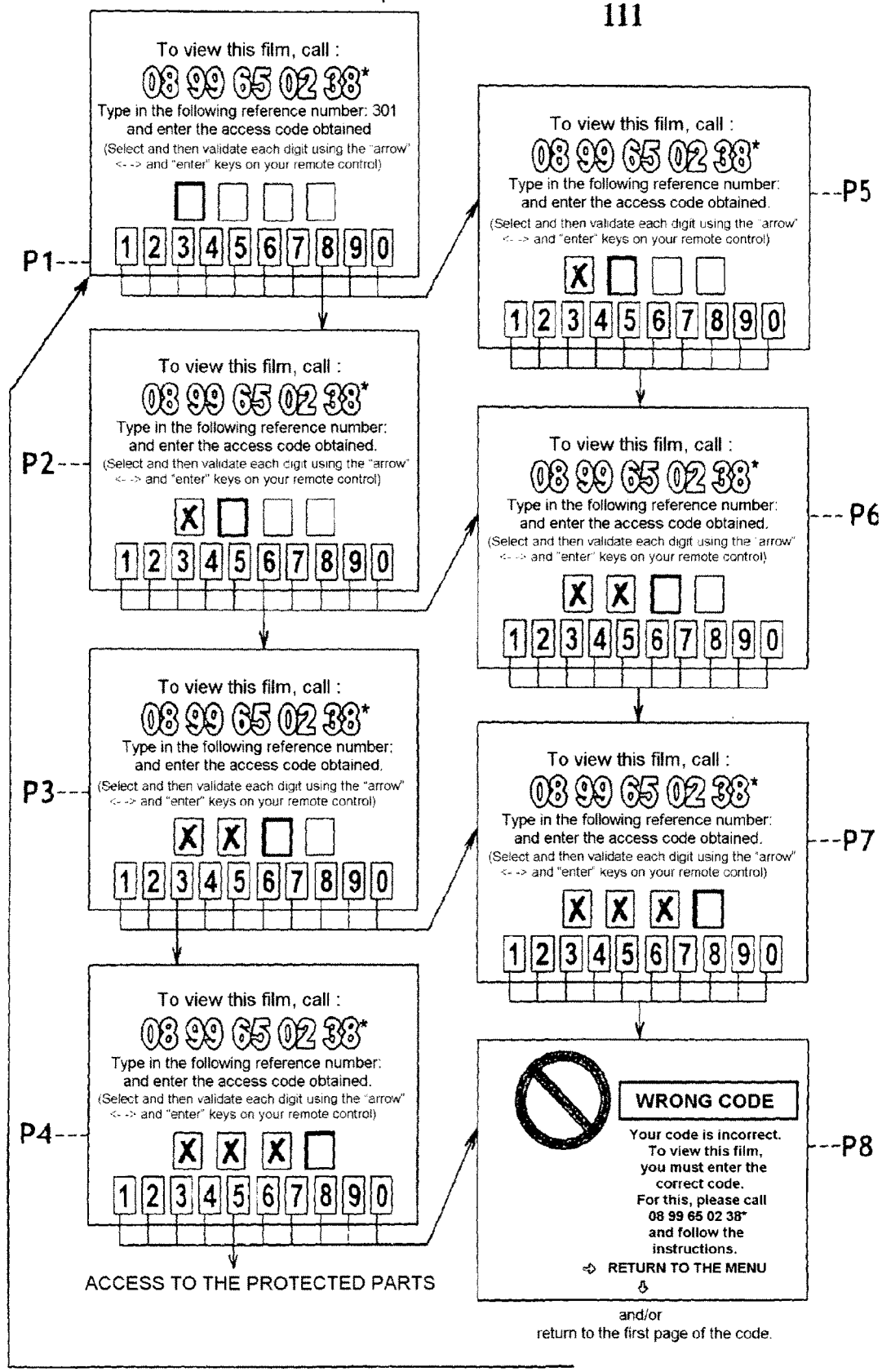

MEANS FOR PROTECTING AGAINST NON-AUTHORISED READINGS OF A RECORDING SUPPORT

The present patent application is a non-provisional application of International Application No. PCT/EP2006/069170, filed Nov. 30, 2006.

The present invention relates a device to limit access to part or all of the data recorded on a read-only medium such as a DVD, CD or any audio, video, multimedia, or other medium.

Taking the example of films on DVD, the latter are traditionally viewable by all people who are in possession of a DVD player.

The publisher of a video DVD is only able to place on DVD a film (or any other data) that can be watched by all purchasers in possession of the said DVD and a DVD player, but is unable to limit access to a film to a particular selected public.

We are already familiar with certain devices that render conditional access to the playing of a film on DVD, given the knowledge of a secret code. Thus, document WO 2004/109678 described a system in which only the knowledge of a secret code provides access to the player which will enable viewing of the film in a normal and unaltered version. In the absence of this code, playing is authorised with a player that can reproduce only a damaged performance of the work.

A first drawback of this known technique relates the fact that it is necessary to provide instructions, which can include complex mathematical calculations, in order to determine, from an entered code (necessarily structured data and typically a numerical value), a destination on the disk, which is either the player of the programme itself when the code is correct, or an indication of an erroneous code, or the player of a damaged programme if the code is incorrect.

It is therefore necessary that the DVD player should have resources that allow such processing to be effected, this cannot be the case with entry-level players.

Moreover, in a simple version described in this document, where the code introduced is compared to a given value, this value can be read directly from the medium by a fraudster.

Another drawback of this known technique, in one of its embodiments, relates the fact that it necessitates recording of the damaged sequences on the medium itself, in order to reproduce the film in its damaged version, thus limiting the space available for the film in its "normal" version.

The present invention aims to overcome the drawbacks of the prior art, while still remaining compatible with commercially-available DVD players, without requiring that they be modified, and without the need, on the medium, for any instructions to be executed by the player, or requiring, in the player, the resources to perform complex mathematical calculations.

Thus the invention proposes a data medium that is accessible on play, and on which is stored in particular a multimedia performance that is intended to be played by an apparatus that includes a control unit with navigation means, in association with a representation, on a display screen, of the navigation operations effected, with the medium storing an authoring composition that includes pages to be displayed on the screen, and links between these pages as a function of the navigation operations effected within the latter, characterised in that the composition contains a collection of selection pages, each allowing a user, using the navigation means, to make one of a plurality of choices in order to form a combination of choices, with the links between these pages being such that the playing of the work is rendered possible only if the various choices effected correspond to a predetermined combination.

Certain preferred but not limiting aspects of this medium are as follows:

the combination is in a sequence.

the composition includes a first set of selection pages that are linked together according to a process in which all of the choices corresponding to a correct combination are made, and a second set of selection pages of identical appearance to at least some of the pages of the first set, which are linked together independently of the choice effected, and linked to respective pages of the first set for any erroneous choice in the said respective pages.

the elements of choice contained in the pages are displayed in the form of alphanumerical characters, drawings or words.

the work is recorded on the medium in a multitrack format that, at least for the video or the audio, has one track that is played by default as a result of direct access to a file on the medium via a computer, while the said track that is played by default has a decoy content, in that another track contains a component of the work as it is to be viewed, and in that the said player includes a pointer to the said other track.

According to a second aspect of the invention, a method is proposed to gain access on play to a multimedia work in particular that is stored on a medium, the said playing operation being effected using an apparatus with a control unit that has navigation means in association with a representation, on a display screen, of the navigation operations effected, and where the medium stores a composition that includes pages to be displayed on the screen, and links between these pages as a function of the navigation operations effected within the latter, this method being characterised in that it includes the following steps:

display of a collection of selection pages, each allowing a user, using the navigation means, to make one of a plurality of choices in order to form a combination of choices, authorisation of the playing of the work on the medium, only if the various choices effected correspond to a predetermined combination.

Certain preferred but not limiting aspects of this method are as follows:

the combination of choices is in a sequence, the composition includes a first set of selection pages, and a second set of selection pages of identical appearance to at least some of the pages of the first set, while a correct choice effected on a page of the first set constitutes a link to a following page of the first set, and any choice effected on a page of the second set constitutes a link to a following page of the second set, and an incorrect choice effected on a page of the first set, the elements of which are linked together independently of the choice effected, and linked to respective pages of the first set for any erroneous choice in the said respective pages, the elements of choice contained in the pages are displayed in the form of alphanumerical characters, drawings or words.

the playing of the work is effected using a player pointing to at least one track of an audiovisual file that is not a default track read as a result of direct access by a computer to the corresponding file on the medium.

It can therefore be seen that as a result of the present invention, it is by navigation of page on page, using the remote control of a DVD player that is not modified in any way, and in accordance with a given navigation sequence, playing of the work becomes possible.

Advantageously, and to the extent that many remote control units of DVD players have no alphanumeric keys, the fixed pages possess a collection of alphanumeric or simply numerical symbols, and navigation between these pages is effected using the up/down/left/right keys and the "OK" or "Enter" or "Validate" key of the remote control unit, since such keys are always provided on these units.

It is thus possible for a user to select a required sequence of alphanumerical or numerical characters, where only this combination allows to navigate to playing of the work.

Other aspects, aims and advantages of the present invention will appear more clearly on playing the detailed description that follows of a preferred embodiment of the latter, provided by way of an non-limiting example and with reference to the appended drawings, in which the single figure illustrates a composition of pages and their links, adapted to implement the method of the present invention.

It is first recalled that playing equipment for DVD media are devices which are interactive for the most part, where the user moves a cursor or other indicating element (framing, crossing-out, underlining, etc.) through the pages of menus whose appearance can be very varied, which are displayed on the television screen set connected to the equipment in order to access one part or another of the data recorded on the DVD medium. Each menu element thus constitutes a link to another menu page that itself has links to other pages, and so on.

The structure and the form of these menus are determined before the manufacture of the DVD medium by a process known as authoring (of which "chaptering" is one of the aspects, and which will henceforth be called "composition"), and are recorded and stored on the DVD medium in a standard format that is recognised by the equipment during the playing process.

According to the present invention, amongst other things, the authoring of a DVD medium is designed to authorise playing of the content only if the user knows a certain code which, for example, can be a combination of N numbers, but that can also be a combination, in a sequence or not, of any numbers, letters, symbols, words, drawings, etc.

In what follows, an example will be given of an embodiment of the invention in which the code necessary to play the content is a 4-digit numerical code, here "8 6 3 5".

On the insertion of the DVD into the player, a welcome page is displayed automatically or by pressing a "menu" key, and from this, the user can move through various interactive menus of the DVD in order to access different parts, in a manner that in itself is conventional.

Referring now to the figure, if during such a navigation process, the user wishes to access a part that is protected or secured by a code, according to the present invention, then the authoring recorded on the DVD is such that it first accesses a page (P1) that contains an indication inviting him to introduce the first character of the code.

Using the up/down/left/right keys of the remote control unit, the user then brings the cursor displayed on the screen onto the first digit of the code, and then validates by pressing the selection validation key (the key conventionally known as "Enter", "OK", "Validate", etc. on a shop-bought apparatus).

On the assumption that the user has above selected a digit other than the first digit of the code (8 in this case), then the authoring is such that it results in access to another selection page P5 inviting selection of the second digit. At this step, whatever the digit selected and validated, this results in access to another selection page P6 inviting selection of the third digit. Once again, whatever the character selected and then validated, the process leads to another selection page P7 for selection and validation of the fourth digit. Here again, whatever the character selected and then validated, the authoring directs the user to a page P8 which informs him that the code entered is not valid.

This page can include return links to the welcome page of the DVD, or again to the first page P1 for entry of the code, or to other pages, but in any case includes no link to a page capable of authorising the playing of the recorded programme.

If, during the selection of the first digit of the code, the user selected the correct code (namely 8), this constitutes a link to another page P2 inviting the user to select the second character. If an erroneous digit (in this case other than 6) is selected at this step, then it is to selection page P6 to which the process is directed. From this point, whatever the other numbers entered, the process end up on page P8, indicating a code error.

On the other hand, if the user selected the correct digit (6) at page P2, then this selection constitutes a link to page P3, where the third character of the code must be entered.

If an erroneous digit is entered at this step, then the authoring is such that it is to page P7 that the process is directed, after which, whatever the fourth digit selected, one arrives at a code error indication at page P8.

On the other hand, if the correct digit (3) is selected on page P3, then the process leads to selection page P4, whose appearance is identical to that of figure P7, for selection of the fourth digit of the code. If the digit selected is incorrect, then the process is directed to error page P8. On the other hand, if the correct digit (5) is selected, the process arrives either directly at access to the player of the programme, to start the playing of the latter directly, or at an intermediate page, especially in the case where the DVD contains several protected programmes, or different executions of the programme by different players, etc., in order to allow the user to choose what he wants to view.

A first advantage of the process described above is that it is implemented with a commercially available DVD player, which does not have to be modified. Another advantage relates the fact that the user is incapable of deducing, from the behaviour of the authoring process, which digits of the code were incorrect, since pages P2 and P5, P3 and P6 and finally P4 and P7 are strictly identical in the case of each pair. This renders the task of violating the combination as difficult as when, for example, a numerical code is entered in full on a keyboard before validation. In particular, for each element chosen, whether it corresponds to the correct combination or not, the appearance of the following page is always the same.

It can be seen that the above description can include many variants. In particular, to the extent that the secret combination is obtained without the entry of information and verified with no calculation necessary, but simply by navigation in the context of an authoring process that has been designed for this purpose, it can be seen that the combination can be composed of numbers, letters, drawings, whole words, etc., without distinction, where the correct version of each of these must be selected and validated at each stage. It can also be seen that the protection system of the invention is operational on any player on the market.

In addition, it is clear that the content of a DVD medium can be played without difficulty from a commercially available computer, by bypassing the authoring recorded on the medium. It is thus possible to navigate through the tree structure of a DVD medium, and to double-click files of the vob type in order to play the material without going through the chaptering menus.

According to an enhanced version of the present invention, access is provided to these files for the purpose of normal playing of the recorded programme that is more difficult.

In this regard, it is known that a file in the .vob format can contain several video tracks. This option, offered by this format, has been provided historically, for example, to allow the user to choose one of several angles of view of a given scene.

It is thus possible to compare a .vob file with a series of video tracks, V1 to Vn, with which a single stereo track, or a series of stereo tracks in the case of multilingual versions, is/are associated.

By default, when a double click is effected on a .vob file on a personal computer, it is the first video track V1 that is played.

The enhancement to the invention consists of providing the video part of the genuine programme on track V2 for example, while track V1 has a decoy video content which does not correspond to the programme. Typically, this can be either a completely black track or a track containing a still image, indicating that a code is necessary in order to view the content, or any other content that does not meet the expectations of the user.

In parallel, the aforementioned authoring system is such that the player or players that are accessible via the secret combination refer to the appropriate video tracks.

At the same time, the function for changing the angle of view must be de-activated on the DVD medium, so as to prevent the user from playing anything other than the decoy video tracks when he has not succeeded in accessing the player corresponding to the genuine programme.

In a variant, it is possible to use a decoy audio track in place of the normal audio track, using the same principle.

Naturally, the present invention is not limited in any way to the embodiments described above, and represented in the drawings, and in fact those skilled in the art will be able to add many variants or modifications to it.

In particular, it applies to any interactive environment by navigation leading to access to data, such as video, audio, still images, text, etc., and to any type of medium for these data, such as DVD, CD-Video, mini video disk, etc.

Moreover, since authoring allows the prevention of access to a content, it can be put in place as many time as is necessary on a give medium, with different combinations, in order to protect different content in each case.

The invention claimed is:

1. A non-transitory machine readable medium that stores instructions for accessing and playing a multimedia work stored on the medium, wherein when the instructions are executed by a control unit:
    display, by the control unit, a collection of pages associated with the multimedia work and stored on the medium and distinct from the multimedia work, wherein the pages include a set of links that are selectable through user input and logically link the pages;
    provide a navigation means to allow selection, by a user, the links on the pages; and
    play, by the control unit, the multimedia work in response to the selection of a predetermined combination of navigation choices between links on the pages, wherein successive navigation choices that do not correspond to a predetermined combination of navigation choices do not allow the multimedia work to be played by the control unit,
    wherein the collection of pages comprises at least a reference page, a first page, and a second page, wherein the first page and the second page have an identical appearance, wherein the reference page includes a first link to the first page and a second link to the second page, wherein the first link is part of the predetermined combination of navigation choices and the second link is not part of the predetermined combination of navigation choices.

2. The non-transitory machine readable medium according to claim 1, wherein the predetermined combination of navigation choices is represented by a sequence of the pages.

3. The non-transitory machine readable medium according to claim 1 or claim 2, wherein the collection of pages includes a first set of selection pages which are linked together according to a process in which all of the link choices corresponding to the predetermined combination of navigation choices are chosen, and a second set of selection pages of identical appearance to at least some of the pages of the first set, wherein the second set of pages are linked together independently of the choice effected, and linked to the respective pages of the first set for any erroneous choice in the said respective pages.

4. The non-transitory machine readable medium according to claim 3, wherein the link choices on the pages are displayed in the form of alphanumerical characters, drawings or words.

5. The non-transitory machine readable medium according to claim 1, wherein the multimedia work is recorded on the medium in a multitrack format that has at least one video and audio track that is played by default as a result of direct access to a file on the medium without selection of navigation choices, and another video and audio track that is played if the predetermined combination of navigation choices is selected, wherein the default video and audio track contains decoy content, whereas the other track contains the original content of the multimedia work as it was originally intended to be viewed.

6. A method for accessing and playing a multimedia work stored on a medium, comprising:
    displaying, by a control unit, a collection of pages associated with the multimedia work and stored on the medium and distinct from the multimedia work, wherein the pages include a set of links that are selectable through user input and logically link the pages;
    providing a navigation means to allow selection, by a user, the links on the pages; and
    playing, by the control unit, the multimedia work in response to the selection of a predetermined combination of navigation choices between links on the pages, wherein successive navigation choices that do not correspond to a predetermined combination of navigation choices do not allow the multimedia work to be played by the control unit,
    wherein the collection of pages comprises at least a reference page, a first page and a second page, wherein the first page and the second page have an identical appearance, wherein the reference page includes a first link to the first page and a second link to the second page, wherein the first link is part of the predetermined combination of navigation choices and the second link is not part of the predetermined combination of navigation choices.

7. The method according to claim 6, wherein the predetermined combination of navigation choices is represented by a sequence of the pages.

8. The method according to claim 7, wherein the collection of pages includes a first set of selection pages and a second set of selection pages of identical appearance to at least some of the pages of the first set, wherein a correct choice effected on a page of the first set constitutes a link to a following page of the first set, in that any choice effected on a page of the second set constitutes a link to a following page of the second set, and in that an incorrect choice effected on a page of the first set constitutes a link to a respective page of the second set.

9. The method according to claim 8, wherein link choices on the pages are displayed in the form of alphanumerical characters, drawings or words.

10. The method according to any of claims 6 to 9, wherein when an audiovisual file stored on the medium is directly accessed to play the multimedia work, the playing of the multimedia work corresponds to accessing an track of the audiovisual file distinct from the default track for the file.

\* \* \* \* \*